United States Patent
Geissler et al.

(10) Patent No.: US 7,011,514 B2
(45) Date of Patent: Mar. 14, 2006

(54) APPARATUS FOR REMOVING AND/OR PLACING A WORKPIECE FROM OR IN AN INJECTION MOLD OF AN INJECTION MOLDING MACHINE

(75) Inventors: Anton Geissler, Eching (DE); Michael Menk, Hebertshausen (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 113 days.

(21) Appl. No.: 10/827,827

(22) Filed: Apr. 20, 2004

(65) Prior Publication Data

US 2004/0197438 A1   Oct. 7, 2004

Related U.S. Application Data

(63) Continuation of application No. PCT/EP02/08740, filed on Aug. 6, 2002.

(30) Foreign Application Priority Data

Oct. 26, 2001   (DE) ............................... 101 52 936

(51) Int. Cl.
*B29C 31/08* (2006.01)
*B29C 45/42* (2006.01)
(52) U.S. Cl. .................... 425/556; 425/126.1; 425/444
(58) Field of Classification Search ................ 425/422, 425/436 RM, 444, 556, 126.1
See application file for complete search history.

(56) References Cited

U.S. PATENT DOCUMENTS

| 3,947,208 A | * | 3/1976 | Broderick | 425/436 R |
| 4,204,824 A | | 5/1980 | Paradis | 425/436 R |
| 4,368,018 A | | 1/1983 | Rees et al. | 425/138 |
| 5,037,597 A | * | 8/1991 | McGinley et al. | 264/238 |

FOREIGN PATENT DOCUMENTS

| DE | 199 39 228 A | 2/2001 |
| DE | 199 50 726 A | 4/2001 |

* cited by examiner

*Primary Examiner*—Duane Smith
*Assistant Examiner*—Emmanuel S. Luk
(74) *Attorney, Agent, or Firm*—Henry M. Feiereisen

(57) ABSTRACT

Apparatus for removing and/or placing a workpiece from or into an injection mold of an injection molding machine includes a fixed platen and a moving platen which have attached thereon respective half-molds. A toothed rack is firmly connected to the fixed platen and engages with a drive pinion of a globoid cam gear which is disposed on the moving platen or attached half-mold and has an output shaft for attachment of a gripper arm. To prevent the gripper arm from moving into an undesired position, when the injection mold is opened beyond a predefined distance, the toothed rack and the fixed platen are connected through the intervention of a detachable coupling, whereby a release mechanism is provided to disengage the coupling when a distance between the fixed and moving platens exceeds a predetermined value.

12 Claims, 3 Drawing Sheets

APPARATUS FOR REMOVING AND/OR PLACING A WORKPIECE FROM OR IN AN INJECTION MOLD OF AN INJECTION MOLDING MACHINE

CROSS-REFERENCES TO RELATED APPLICATIONS

This application is a continuation of prior filed copending PCT International application No. PCT/EP02/08740, filed Aug. 6, 2002, which designated the United States and on which priority is claimed under 35 U.S.C. §120, the disclosure of which is hereby incorporated by reference.

This application claims the priority of German Patent Application, Serial No. 101 52 936.8, filed Oct. 26, 2001, pursuant to 35 U.S.C. 119(a)–(d), the disclosure of which is incorporated herein by reference.

BACKGROUND OF THE INVENTION

The present invention relates to an apparatus for removing and/or placing a workpiece from or in an injection mold of an injection molding machine, in particular injection molding machine for processing plastics.

Injection-molded articles have to be removed cyclically from the open injection molding machine, before a next injection-molding step can begin. German patent publication no. DE 199 39 228 describes an extraction unit having a globoid cam gear which is controlled as a consequence of a relative movement between the fixed and moving platens to thereby operate a swingable lever with attached gripping mechanism. The globoid cam gear is hereby supported upon the moving platen and driven by a toothed rack which is connected to the fixed platen.

This type of extraction unit suffers shortcomings because the toothed rack continues to operate the globoid cam gear, when the mold opens beyond a preset stroke during normal operation, so that the swingable lever assumes an undesired position. In the event, the mold opens even further, there is the risk of disengagement of the toothed rack from the spur gear that is seated on the output shaft of the globoid cam gear and detachment of the bearing of the toothed rack upon the cam gear.

Excessive opening strokes of platens are oftentimes caused during operation of an injection molding machine because the control of the clamping mechanism may become defective, or because necessary maintenance works or mold exchange needs to be done. If the injection molding machine should be returned to the normal operating state, after undergoing such an excessive opening, care must be taken to precisely fit the engagement between the toothed rack and the globoid cam gear and to precisely set the operating point of the globoid cam gear in order to accurately match the movement of the swingable lever.

It would therefore be desirable and advantageous to provide an improved apparatus for removing and/or placing a workpiece from or in an injection mold of an injection molding machine, to obviate prior art shortcomings and to operate in a reliable manner, even when a predefined end position of the opening stroke is exceeded.

SUMMARY OF THE INVENTION

According to one aspect of the present invention, an apparatus for extracting and/or depositing a workpiece from or in an injection mold of an injection molding machine, includes a toothed rack, a detachable coupling for connecting the toothed rack to a fixed platen of the injection molding machine, a globoid cam gear attached to a moving platen of the injection molding machine or to a half-mold mounted to the moving platen, with the globoid cam gear having a drive pinion in driving relationship with the toothed rack, and an output shaft, a gripper arm secured to the output shaft, and a release mechanism for disengaging the coupling, when a distance between the fixed and moving platens exceeds a predetermined value.

The present invention resolves prior art problems by constructing the drive for the gripper arm in the form of a globoid cam gear which is operated in response to the relative movement of fixed and moving platens. The gripper arm is configured to have a gripper mechanism disposed on one end for removal and/or placement of the workpieces and swinging about an axis in parallel relationship to the opening direction of the mold. The use of a globoid cam gear is especially appropriate when travel along distances is involved and accuracy and reproducibility is demanded. This is the case for the swinging movement of the gripper arm which should assume the gripping position as rapidly as possible, without touching machine components, when the mold is opened, in order for the gripper mechanism to pick up or deposit the workpiece. During subsequent closing of the mold, the gripper arm together with the workpiece reverses the swinging movement and moves out of the opening. Also in this situation, no obstruction should be encountered between injection molding machine and gripper arm with workpiece. Precision of the travel path is a determinative factor for clock times that can be realized with the injection molding machine.

The use of a globoid cam gear affords also the possibility to predefine so-called dead centers of the output shaft of the cam gear, whereby the output shaft is stationary in the dead centers, even though the input shaft may continue to run. Thus, in accordance with the present invention, the swinging movement of the gripper arm is initiated only after moving a short initial opening stroke, to assure a sufficient distance from all machine components, even when swinging back with the workpiece. In addition, the gripper arm reaches the gripping position already at a point of the opening stroke which is located ahead of the end position of the opening stroke. Thus, a further opening of the mold to assume the end position does no longer influence the position of the gripper arm in view of the configuration of the globoid cam gear. As a consequence, a greater tolerance for the end position of the opening stroke is established.

The globoid cam gear is operated by the toothed rack that is connected to the fixed platen and so supported upon the globoid cam gear that the toothed rack engages the fixed platen, when the distance between the fixed and moving platens falls below the predetermined value. The toothed rack may hereby engage the drive pinion, which is firmly secured to the input shaft of the cam gear, so as to rotate the pinion as the fixed and moving platens move relative to one another.

The coupling for connecting the fixed platen and the toothed rack can be released as soon as the moving platen travels beyond the end position of the opening stroke. In this way, the predefined end point of the globoid curve cannot be overrun. In addition, an uncontrolled and unintended movement of the gripper arm beyond the gripping position can thus be prevented, which would take pace when overrunning the end position and is dependent on the configuration of the globoid curve.

In order to separate the time instance of release of the coupling from external parameters such as drive of the gripper arm, the coupling operates in response to the opening stroke.

The toothed rack is so supported on the globoid cam gear as to be borne by a fork which is securely fixed to the globoid cam gear. The fork engages a mechanical release mechanism on the side of the toothed rack for disengaging the coupling and is so constructed as to activate the release mechanism, when the travel of the fork exceeds a predetermined distance. The fork is hereby also configured to allow easy and reliable re-engagement of the toothed rack, when the platens move back into a closing position and following an overrun of the end position of the opening stroke, whereby the globoid cam gear automatically assumes the correct end position. As a result, there is no need to precisely fit the toothed rack into a bearing assembly upon the globoid cam gear, and there is no longer any need to re-adjust the precise position of the globoid cam gear in relationship to the opening stroke of the injection mold, as required to date.

According to another feature of the present invention, the coupling may be constructed as a ball coupling. The coupling is hereby so constructed that one end of the toothed rack, which faces the fixed platen, is formed with a ring-shaped groove, for moving into a substantially hollow-cylindrical coupling member which is secured to the fixed platen. Moveably disposed in this coupling member are balls which engage in the groove of the toothed rack and are anchored in the groove by a substantially hollow-cylindrical sleeve disposed in surrounding relationship to the toothed rack. The sleeve is biased by a spring against the toothed rack and movable in longitudinal direction. On the side of the toothed rack, the sleeve has a flanged thickened area. The fork to support the toothed rack embraces the sleeve and is essentially freely movable along the sleeve. In the event, the injection mold overruns the end position of the opening stroke, the fork engages the flange of the sleeve and conjointly moves the sleeve in opposition to the spring tension away from the fixed platen. As a consequence, the balls are liberated and the coupling is released, so that a relative movement between the globoid cam gear and the toothed rack can no longer take place, and the gripper arm as well as the globoid cam gear are secured in their position, i.e. the gripping position, irrespective from a further movement of the moving platen.

According to another feature of the present invention, the release mechanism may include a linkage to establish a firm connection between the fork and the sleeve, when the toothed rack is engaged. As a result, the sleeve is moved back already during opening of the injection mold in opposition to the spring tension between sleeve and toothed rack, so that the coupling between the toothed rack and the fixed platen is released at the beginning of the opening stroke while the globoid cam gear still occupies a dead center in which a movement of the input shaft is not translated into a movement of the output shaft. Thus, the gripper arm remains in the idle position outside the injection zone because of the absence of a relative movement between the toothed rack and the globoid cam gear. In particular, when maintenance works or mold exchanges are involved, the injection mold can thus be opened, without moving the gripper arm into the gripping position.

According to another feature of the present invention, the linkage may include a bolt. During actuation, the bolt is able to engage in a respective recess on the sleeve. Suitably, a hydraulic operator is provided for controlling operation of the bolt.

The present invention thus provides an apparatus for removing and/or placing a workpiece from or in an injection mold of an injection molding machine, which apparatus displays especially beneficial and reliable operating conditions.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
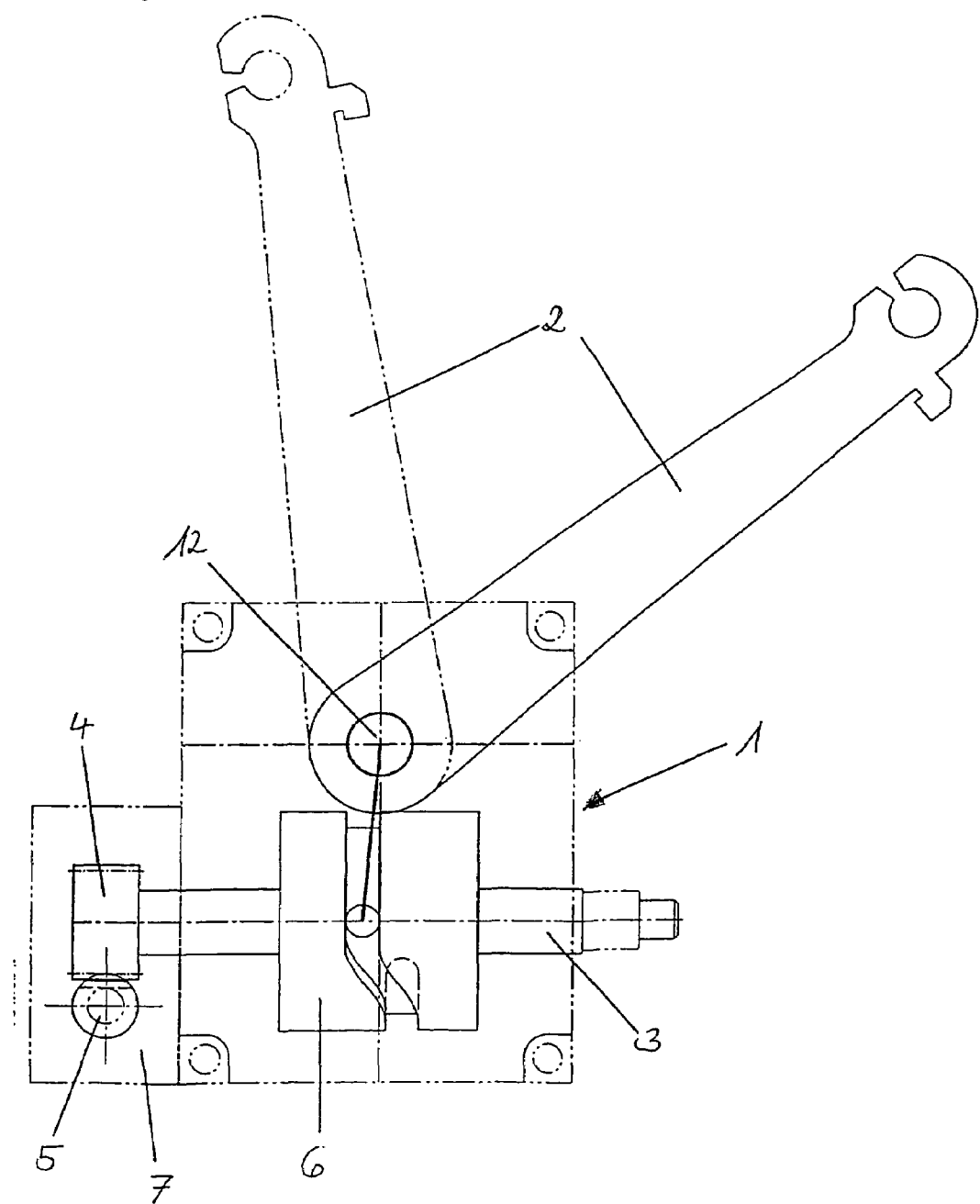
FIG. 1 is a sectional view of a globoid cam gear for a novel and inventive apparatus for removing and/or placing a workpiece from or in an injection mold of an injection molding machine.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a sectional view of a globoid cam gear, generally designated by reference numeral 1 and provided for a novel and inventive apparatus for removing and/or placing a workpiece from or in an injection mold of an injection molding machine. The globoid cam gear 1 includes a globoid cam roller 6 with an input shaft 3 which is driven by a drive pinion 4 securely fixed to the input shaft 3 and constructed for engagement with a toothed rack 5. A movement of the toothed rack 5 in a direction perpendicular to the drawing plane causes the drive pinion 4 to rotate about the input shaft 3. The toothed rack 5 is connected via a bearing unit 7 with the globoid cam gear 1 for movement in longitudinal direction. A rotation of the cam roller 6 while the globoid cam gear 1 moves longitudinally at the same time, causes a gripper arm 2 to move along a predefined three-dimensional path. In the illustration of FIG. 1, the gripper arm 2 executes a rotation about an output shaft 12 of the globoid cam gear 1 between two end positions shown in continuous line and dash-dot line, respectively.

Referring now to FIGS. 2a to 2d, there are shown side sectional views of an apparatus according to the present invention in various opening phases between a fixed plate 10 and a moving platen 11 of the injection mold.

In FIG. 2a, the toothed rack 5 is connected to the fixed platen 10 by means of a detachable coupling 18. The globoid cam gear 1 with the input shaft 2 and the bearing unit 7 for securement of the toothed rack 5 upon the cam gear 1 are shown here only schematically. The gripper arm 2 is secured to the output shaft 12 of the cam gear 1. A connection member in the form of a curved fork 13 is mounted to the cam gear 1 and is in engagement with the coupling 18. The coupling 18 has a coupling member 19 which is mounted to the fixed platen 10 and constructed for movable support of a plurality of balls 16. FIG. 2a shows a closed disposition of the injection mold, whereby the toothed rack 5 is engaged in the coupling member 19 via a leading docking end 17 which is formed with a groove 22 for engagement by the plurality of balls 16. A substantially hollow-cylindrical sleeve 14 is disposed in surrounding relationship to the toothed rack 5 to form-fittingly secure the balls 16 in place. The sleeve 14 is biased by a spring 15 against the toothed rack 5 so that the coupling 18 is engaged, when the injection mold assumes the closed position. The fork 13 embraces the sleeve 14 in a substantially freely movable manner and interacts with the sleeve 14 via an outwardly turned flange 23 at a sleeve end distal to the coupling member 19. The flange 23 prevents also a detachment of the fork 13, as the fork 13 moves in a direction away from the coupling member 19, i.e. to the right in the drawing.

As stated above, FIG. 2a shows the coupling 18 engaged, with the docking end 17 of the toothed rack 5 received in the coupling member 19, whereby half molds (not shown) of the injection mold are clamped together. The gripper arm 2 assumes the idle position outside the injection mold.

As the injection mold opens, as shown in FIG. 2b, the distance between the fixed platen 10 and the moving platen 11 increases so that the cam gear 1 is moved to the right. As a consequence of the displacement of the cam gear 1, the fork 13 moves along the sleeve 14 to the right as well. After overcoming a dead center at the beginning of the opening stroke, the gripper arm 2 swings from the idle position into the area of the injection mold just before the moving platen 11 reaches the end position of the opening stroke. During the remaining displacement between the time the gripper arm 2 assumes the gripping position and the cam gear 1 reaches the end position, the cam gear 1 occupies again a dead center, in a same way as at the beginning of the opening stroke so that the output shaft 12 is not driven despite a relative movement between the toothed rack 4 and the drive pinion 4. In the end position of the apparatus, as shown in FIG. 2b, the coupling 18 is still engaged, and the fork 13 is positioned immediately adjacent to the flange 23 at the (right-hand) end of the sleeve 14, without applying a force thereon as of yet.

During normal operation, the platens 10, 11 remain in the end position, whereby a gripper device (not shown) on the gripper arm 2 is able to remove a workpiece from the injection mold or deposits a workpiece in the injection mold. After this operation, as the injection mold begins to close again, the gripper arm 2 swings out of the injection mold and back into the idle position. In the non-limiting example shown in the drawing, the gripper arm 2 executes a swinging motion of about 60°. Of course, any other angle is conceivable as well.

In order to simplify the removal or placement of a workpiece from or in the injection mold, the cam gear 1 may also be supported for longitudinal movement in relation to the moving platen 11.

In the event, the opening stroke of the platens 10, 11 continues beyond the predefined end position, the distance between the platens 10, 11 increases further. Thus, the fork 13 abuts against the flange 23 of the sleeve 14 and moves the sleeve 14 in opposition to the spring 15. This situation is shown in FIG. 2c. As a consequence, the balls 16 fixed in the groove 22 are liberated, and the coupling 18 disengages. During the movement between engagement of the fork 13 and release of the coupling 18, the cam gear 1 remains in dead center so that the gripper arm 2 remains fixed in the gripping position.

FIG. 2d shows the apparatus with disengaged coupling 18, i.e. the docking end 17 of the toothed rack 5 is separated from the coupling member 19.

When the fixed platens 10, 11 are closed again from the position beyond the end position of the opening stroke, the process shown in FIGS. 2a to 2d is reversed until the docking end 17 of the toothed rack 5 locks again in the coupling member 19, attached to the fixed platen 10, and the balls 16 are fixed in place by the sleeve 14 in the groove 22 of the toothed rack 5. The sleeve 14 in turn is secured by the spring 15 to the toothed rack 5, while the fork 13 is able to freely glide along the sleeve 14. The injection molded process may now resume again.

Figure 2:
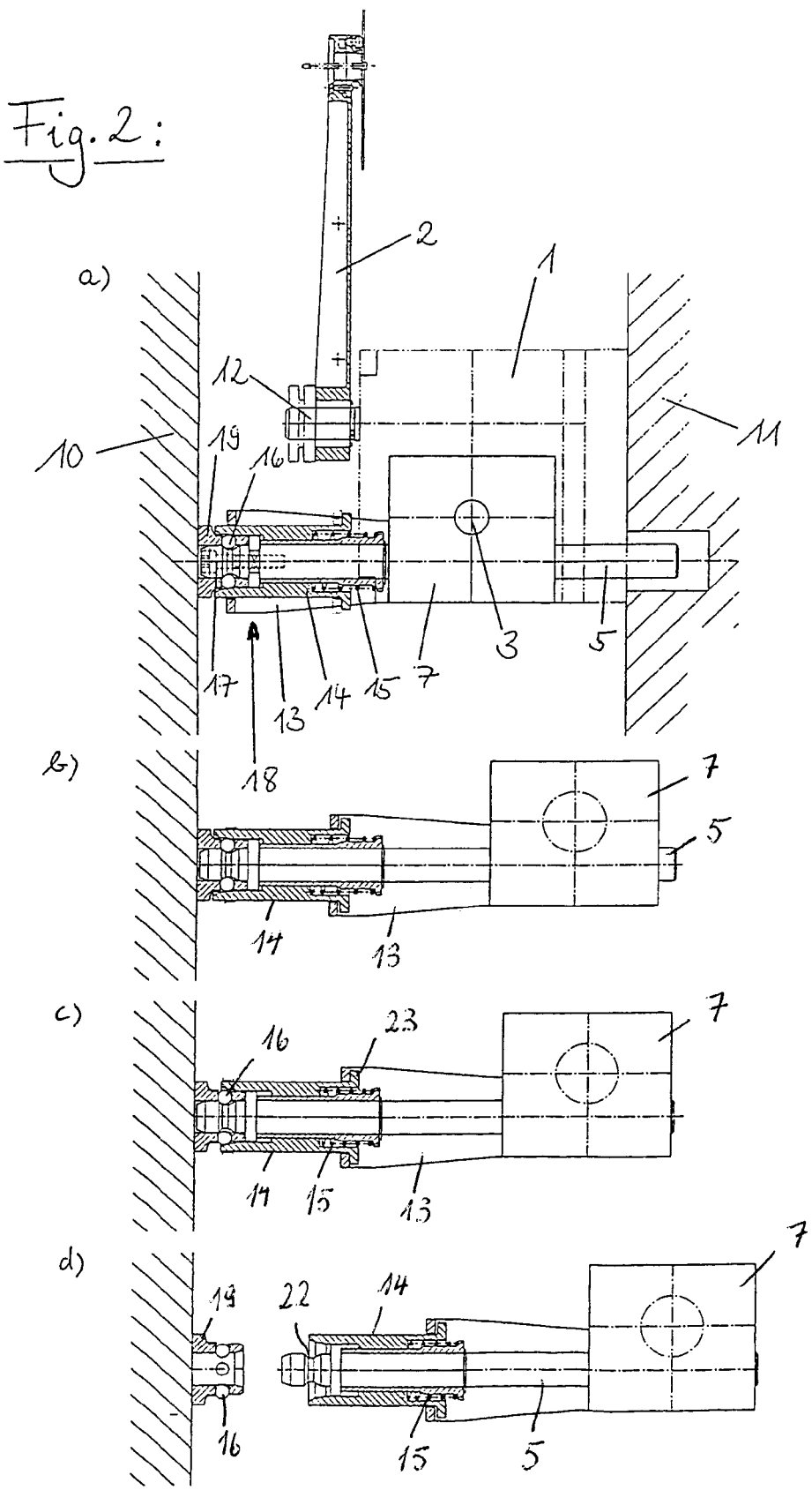
FIGS. 2a–2d depict side sectional views of the apparatus of FIG. 1, illustrating various opening phases of the injection mold.
Figure 3:
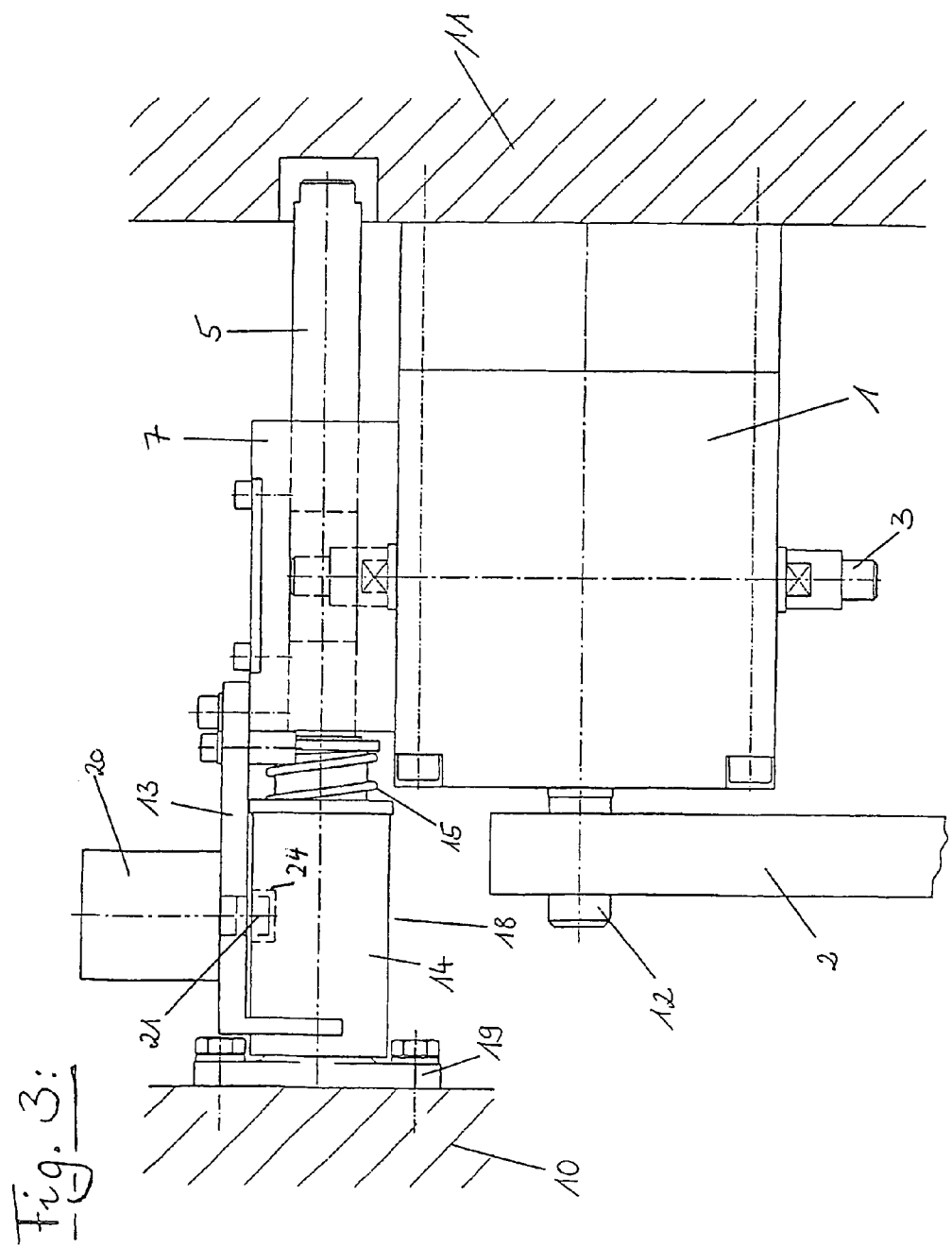
FIG. 3 is a plan view of another embodiment of a novel and inventive apparatus for removing and/or placing a workpiece from or in an injection mold of an injection molding machine.

Turning now to FIG. 3, there is shown a plan view of another embodiment of a novel and inventive apparatus for removing and/or placing a workpiece from or in an injection mold of an injection molding machine. Parts corresponding with those in FIGS. 1 and 2 are denoted by identical reference numerals and not explained again. The description below will center on the differences between the embodiments. In this embodiment, provision is made for a linkage 20 which is mounted to the fork 13. The linkage 20 includes a bolt 21 which can be activated, e.g. by a hydraulic operator (not shown), to establish a fixed connection between the fork 13 and the sleeve 14 through engagement in a recess 24 of the sleeve 14. The half molds (not shown) of the platens 10, 11 occupy in FIG. 3 the closed position, while the gripper arm 2, which is mounted to the output shaft 12 of the cam gear 1, assumes the idle position outside the injection mold. When initiating an opening stroke, while the bolt 21 is activated to establish the locked connection through engagement in the recess 24, the sleeve 14 is immediately moved by the fork 13, and the coupling 18 between the toothed rack 5 and the fixed platen 10 is released already at commencement of the opening stroke. The globoid cam gear 1 still remains hereby in the forward dead center. The injection molding machine can thus be opened, without requiring the gripper arm 2 to leave the idle position. This is advantageous especially when maintenance work or mold exchange is involved.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. Apparatus for extracting and/or depositing a workpiece from or in an injection mold of an injection molding machine, comprising:
   a toothed rack;
   a coupling for detachably connecting the toothed rack to a fixed platen of the injection molding machine;
   a globoid cam gear attached to a moving platen of the injection molding machine or to a half-mold mounted to the moving platen, said globoid cam gear having a drive pinion in driving relationship with the toothed rack, and an output shaft;

a gripper arm secured to the output shaft; and a release mechanism for disengaging the coupling when a distance between the fixed and moving platens exceeds a predetermined value.

2. The apparatus of claim 1, wherein the toothed rack is so supported upon the globoid cam gear that the toothed rack re-engages the fixed platen, when the distance between the fixed and moving platens falls below the predetermined value.

3. The apparatus of claim 1, wherein the coupling is a ball coupling.

4. The apparatus of claim 1, wherein the release mechanism is a mechanical release unit.

5. The apparatus of claim 4, wherein the release mechanism includes a connection member securely fixed to the globoid cam gear, said coupling including an opening mechanism constructed for engagement with the connection member.

6. The apparatus of claim 5, wherein the release mechanism includes a linkage to establish a firm connection between the connection member and the opening mechanism, when the toothed rack engages the fixed platen.

7. The apparatus of claim 6, wherein the linkage includes a bolt.

8. The apparatus of claim 7, and further comprising a hydraulic operator for controlling the bolt.

9. The apparatus of claim 1, wherein the globoid cam gear is supported for longitudinal movement upon the moving platen or to the half-mold mounted to the moving platen.

10. A release mechanism for a workpiece supply and extraction apparatus of an injection molding machine, comprising:

a first coupling member secured to a fixed platen of an injection mold and constructed for engagement by a toothed rack of the workpiece supply and extraction apparatus, when the injection mold is closed;

a second coupling member operatively connected to the toothed rack; and a force-applying member operatively connected to a moving platen of the injection mold and rendered operative in response to a movement of the moving platen relative to the fixed platen beyond a predetermined opening stroke of the injection mold for displacing the second coupling member to thereby disengage the toothed rack from the first coupling member.

11. The release mechanism of claim 10, wherein the toothed rack automatically engages the first coupling member, when a distance between the fixed and moving platens corresponds to the predetermined opening stroke.

12. The release mechanism of claim 10, and further comprising a linkage to establish a firm connection between the force applying member and the second coupling member, when the toothed rack engages the first coupling member.

* * * * *